United States Patent
Shi et al.

(10) Patent No.: US 11,600,101 B2
(45) Date of Patent: Mar. 7, 2023

(54) LIQUID-CRYSTAL DISPLAY DEVICE

(71) Applicant: WUHAN TIANMA MICRO-ELECTRONICS CO., LTD., Wuhan (CN)

(72) Inventors: Tianzhu Shi, Wuhan (CN); Zhiqi Chen, Wuhan (CN); Chao Dai, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 24 days.

(21) Appl. No.: 17/485,429

(22) Filed: Sep. 26, 2021

(65) Prior Publication Data

US 2022/0012455 A1    Jan. 13, 2022

(30) Foreign Application Priority Data

Jun. 3, 2021   (CN) .......................... 202110620042.5

(51) Int. Cl.
*G06V 40/13*    (2022.01)
*G02F 1/13357*  (2006.01)
*G02F 1/1333*   (2006.01)
*G02F 1/017*    (2006.01)

(52) U.S. Cl.
CPC ...... *G06V 40/1318* (2022.01); *G02F 1/01791* (2021.01); *G02F 1/13338* (2013.01); *G02F 1/133603* (2013.01); *G02F 1/133617* (2013.01); *G06V 40/13* (2022.01)

(58) Field of Classification Search
CPC ............. G02F 1/1336; G02F 1/01791; G02F 1/13338; G06V 40/13
See application file for complete search history.

(56) References Cited

U.S. PATENT DOCUMENTS

2022/0268421 A1* 8/2022 Chen ................... H04M 1/0264

FOREIGN PATENT DOCUMENTS

| CN | 109190592 A |   | 1/2019  |
|----|-------------|---|---------|
| CN | 110737133 A |   | 1/2020  |
| CN | 110750007 A | * | 2/2020  |
| CN | 110750007 A |   | 2/2020  |
| CN | 112099259 A |   | 12/2020 |
| CN | 112198716 A |   | 1/2021  |

* cited by examiner

*Primary Examiner* — Alexander P Gross
(74) *Attorney, Agent, or Firm* — Kilpatrick Townsend & Stockton, LLP

(57) ABSTRACT

Provided is a liquid-crystal display device including a display panel, a backlight module, and a fingerprint identification module. The display panel includes a display region. The display region includes a first display region and a second display region. The second display region also serves as a light sensing element region. The backlight module is configured to provide a backlight for the display panel and is provided with a via penetrating through the backlight module. The fingerprint identification module is disposed inside the via and includes a fingerprint identification sensor, a light plate, and a quantum dot film. The light plate is disposed between the fingerprint identification sensor and the quantum dot film. The quantum dot film is disposed between the light plate and the display panel. The quantum dot film includes at least one quantum dot set. The at least one quantum dot set includes infrared quantum dots.

20 Claims, 11 Drawing Sheets

LIQUID-CRYSTAL DISPLAY DEVICE

CROSS-REFERENCE TO RELATED APPLICATION(S)

This application claims priority to Chinese patent application No. 202110620042.5 filed Jun. 3, 2021, the disclosure of which is incorporated herein by reference in its entirety.

FIELD

The present disclosure relates to the field of display technology and, in particular, to a liquid-crystal display device.

BACKGROUND

A fingerprint of anybody is inherent and unique. With the development of science and technology, various display devices having the function of fingerprint identification appear on the market. Such devices include mobile phones, tablet computers, and smart wearable equipment. In this case, a user can undergo permission validation by using a finger to simply touch a fingerprint identification unit of a display device having a fingerprint recognition function before operating this device. This simplifies the process of permission validation.

The fingerprint is composed of a series of ridges and valleys on the skin surface of a fingertip. The intensity of the light reflected by the ridges and received by the fingerprint identification unit is different from the intensity of the light reflected by the valleys and received by the fingerprint identification unit. Accordingly, the magnitude of the current/voltage signal converted from the reflected light formed at the ridges is different from the magnitude of the current/voltage signal converted from the reflected light formed at the valleys. Thus, fingerprint identification may be performed according to the magnitudes of the current/voltage signals.

To perform fingerprint identification, an infrared emitter is disposed in a liquid-crystal display device. The infrared light emitted from the infrared emitter is projected into a fingerprint identification region. After reflected by a finger, the infrared light is reflected to an infrared receiver for fingerprint identification. In this case, with an aim of matching the transmission of infrared light, a new material that enables the infrared light to pass through is required for forming elements in a backlight module, for example, a brightness enhancement, a diffusion sheet, and a reflection sheet. On one hand, the cost is increased. On the other hand, the new material that enables the infrared light to pass through reduces the light-emitting luminance of the backlight module.

SUMMARY

The present disclosure provides a liquid-crystal display device to reduce the cost and improve backlight uniformity and backlight luminance.

Embodiments of the present disclosure provide a liquid-crystal display device. The liquid-crystal display device includes a display panel, a backlight module, and a fingerprint identification module.

The display panel includes a display region. The display region includes a first display region and a second display region. The second display region also serves as a light sensing element region.

The backlight module is configured to provide backlight for the display panel and is provided with a via penetrating through the backlight module. In the direction perpendicular to the light-emitting surface of the display panel, the via overlaps the light sensing element region.

The fingerprint identification module is disposed inside the via and includes a fingerprint identification sensor, a light plate, and a quantum dot film. The light plate is disposed between the fingerprint identification sensor and the quantum dot film. The quantum dot film is disposed between the light plate and the display panel.

The quantum dot film includes at least one quantum dot set. The at least one quantum dot set includes infrared quantum dots. In fingerprint identification, the light emitted from the light plate includes first light and second light. The first light irradiates the infrared quantum dots and generates infrared light. The fingerprint identification sensor performs fingerprint identification according to the infrared light reflected by a touched body. The second light bypasses the infrared quantum dots and is configured to provide backlight for the display panel.

DETAILED DESCRIPTION

Figure 1:
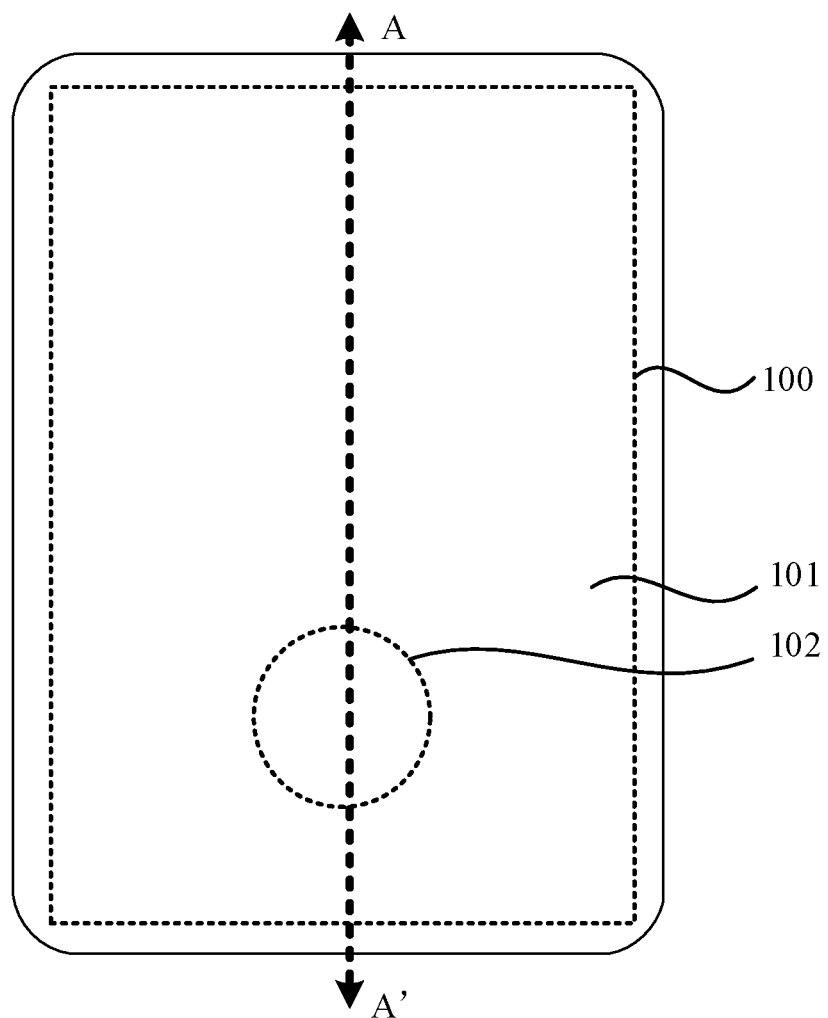
FIG. 1 is a top view illustrating the structure of a liquid-crystal display device according to an embodiment of the present disclosure.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, only part, not all, of structures related to the present disclosure are illustrated in the drawings.

Figure 2:
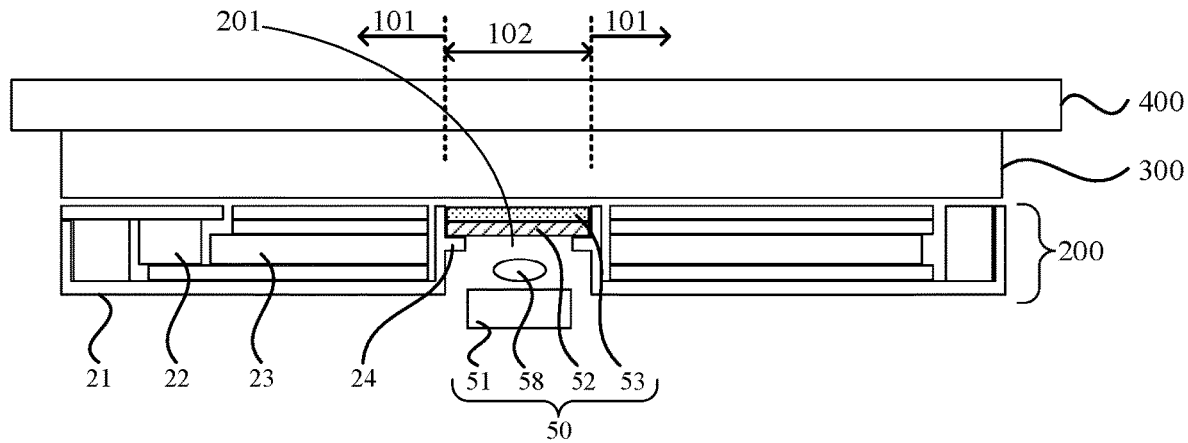
FIG. 2 is a section view taken along direction AA' of FIG. 1.
Figure 3:
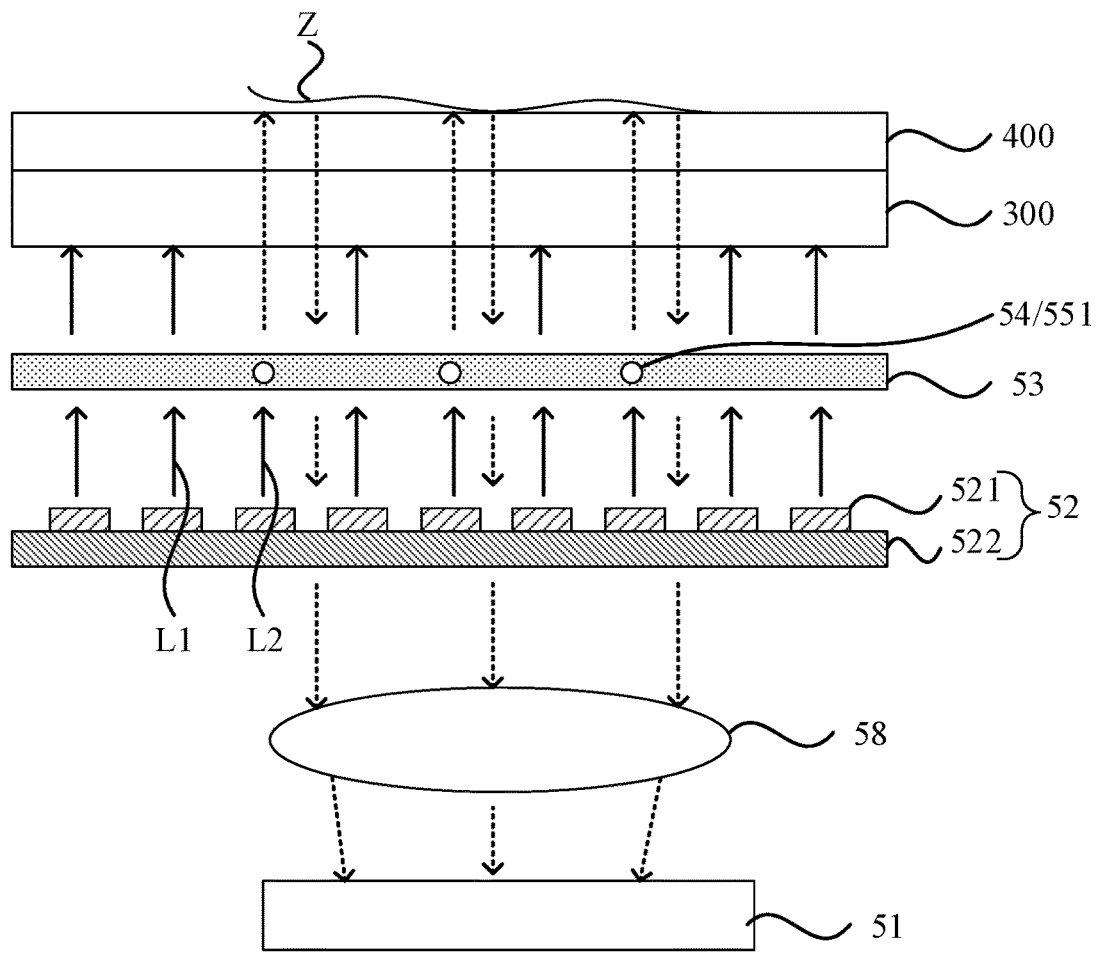
FIG. 3 is a diagram illustrating the light paths of a liquid-crystal display device according to an embodiment of the present disclosure.

FIG. 1 is a top view illustrating the structure of a liquid-crystal display device according to an embodiment of the present disclosure. FIG. 2 is a section view taken along direction AA' of FIG. 1. FIG. 3 is a diagram illustrating the light paths of a liquid-crystal display device according to an embodiment of the present disclosure. Referring to FIGS. 1 to 3, the liquid-crystal display device includes a display panel 300, a backlight module 200, and a fingerprint identification module 50. The display panel 300 includes a display region 100. The display region 100 includes a first display region 101 and a second display region 102. The second display region 102 also serves as a light sensing element region. In display, the first display region 101 and the second display region 102 are both used for displaying images. In fingerprint identification, the second display region 102 is used for getting infrared light to pass through and performing fingerprint detection of a touched body (for example, a finger) in the second display region 102. The backlight module 200 is disposed on a side facing away from the light-emitting display of the display panel 300. That is, the backlight module 200 is disposed at the back of the display panel 300 and configured to provide backlight for the display panel 300. The backlight module 200 is provided with a via 201 penetrating through the backlight module 200. In the direction perpendicular to the light-emitting surface of the display panel 300, the via 201 overlaps the light sensing element region (that is, the second display region 102). The fingerprint identification module 50 is disposed inside the via 201 and includes a fingerprint identification sensor 51, a light plate 52, and a quantum dot film 53. The light plate 52 is disposed between the fingerprint identification sensor 51 and the quantum dot film 53. The quantum dot film 53 is disposed between the light plate 52 and the display panel 300. The quantum dot film 53 includes at least one quantum dot set 54. The at least one quantum dot set 54 includes infrared quantum dots 551. In fingerprint identification, the light emitted from the light plate 52 includes first light L1 and second light L2. The first light L1 irradiates the infrared quantum dots 551 and excites the infrared quantum dots 551 to generate infrared light (as shown by dashed lines in FIG. 3). The infrared light passes through the display panel 300 and is projected to the touched body Z (for example, a finger). Reflected by the touched body Z, the infrared light is projected to the fingerprint identification sensor 51. The fingerprint identification sensor 51 performs fingerprint identification according to the infrared light reflected by the touched body Z. The second light L2 bypasses the infrared quantum dots 551 and does not irradiate the infrared quantum dots 551. After passing through the quantum dot film 53, the second light L2 does not generate infrared light and is used for providing backlight for the display panel. Backlight refers to the light that supports the light-emitting display and illumination of the display panel. Backlight includes visible light.

In the liquid-crystal display device provided in embodiments of the present disclosure, the backlight module 200 is provided with the via 201. The fingerprint identification module 50 is disposed inside the via 201. Accordingly, the infrared light emitted from the fingerprint identification module 50 is transmitted through the via 201 without passing through the optical film layers in the backlight module 200. In this case, no new material that enables infrared light to pass through is required for forming the optical film layers in the backlight module 200. This reduces the cost and avoids reducing the light-emitting luminance of the backlight module 200. Further, the fingerprint identification module includes the fingerprint identification sensor 51, the light plate 52, and the quantum dot film 53. The light plate 52 and the quantum dot film 53 are disposed inside the via 201. The first light L1 among the light generated by the light plate 52 excites the infrared quantum dots 551 to generate infrared light. The light plate 52 serves as the light source for fingerprint identification. The backlight module 200 provides backlight for the first display region 101 of the display panel. The second light L2 among the light generated by the light plate 52 does not excite infrared light and provides backlight for the second display region 102. Thus, backlight uniformity and backlight luminance are improved.

In an embodiment, referring to FIGS. 1 to 3, the liquid-crystal display device further includes a cover plate 400 disposed on a side of the display panel 300 facing away from the backlight module 200. In fingerprint identification, the touched body Z touches a part of the cover plate 400 corresponding to the second display region 102. The infrared light is reflected by the surface of the cover plate 400 facing away from the display panel 300. The intensity of the light reflected by the surface of the cover plate 400 corresponding to ridges of the touched body Z is different from the intensity of the light reflected by the surface of the cover plate 400 corresponding to valleys of the touched body Z. Accordingly, fingerprint identification may be performed according to the intensity of the reflected infrared light.

Figure 4:
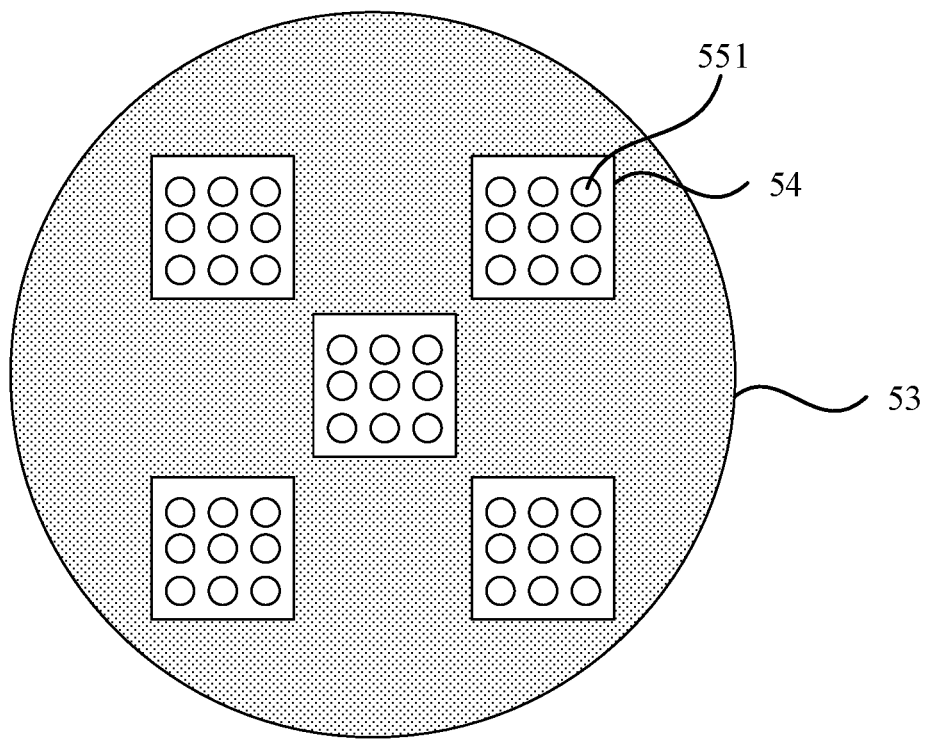
FIG. 4 is a top view illustrating the structure of a quantum dot film according to an embodiment of the present disclosure.

FIG. 4 is a top view illustrating the structure of a quantum dot film according to an embodiment of the present disclosure. Referring to FIG. 4, the quantum dot film 53 includes a plurality of quantum dot sets 54 distributed discretely. In the embodiment of the present disclosure, the quantum dot film 53 includes a plurality of quantum dot sets 54 distributed discretely. The distance between any two quantum dot sets 54 is larger than zero. The first light L1 irradiates the infrared quantum dots 551 in the quantum dot sets 54 and excites the infrared quantum dots 551 to generate infrared light. Part of the second light L2 irradiates the quantum dot sets 54 and bypasses the infrared quantum dots 551, not generating infrared light but generating visible light. The other part of the second light L2 irradiates the regions outside the quantum dot sets 54 in the quantum dot film 53, thus bypassing the infrared quantum dots 551, not generating infrared light but generating visible light. Since the quantum dot sets 54 are distributed discretely in the embodiment of the present disclosure, the regions outside the quantum dot sets 54 in the quantum dot film 53 may be used for getting the second light L2 to pass through. This enlarges the light-transmitting area of the second light L2 and improves the backlight luminance of the second display region 102 in the display panel.

In an embodiment, a plurality of quantum dot sets 54 are disposed in an array. In the embodiment of the present disclosure, a plurality of quantum dot sets 54 are disposed in an array. Accordingly, the first light L1 irradiates the quantum dot sets 54 and excites the infrared light distributed uniformly in the second display region 102. This improves the uniformity of the infrared light irradiating the touched body Z in the process of fingerprint identification and enhances the accuracy of fingerprint identification. Moreover, the quantum dot sets 54 are disposed in an array and the regions outside the quantum dot sets 54 in the quantum dot film 53 are distributed relatively uniformly. Accordingly, after passing through the regions outside the quantum dot sets 54 in the quantum dot film 53, the second light L2 forms a relatively uniform backlight. This enhances the display quality of the liquid-crystal display device.

Figure 5:
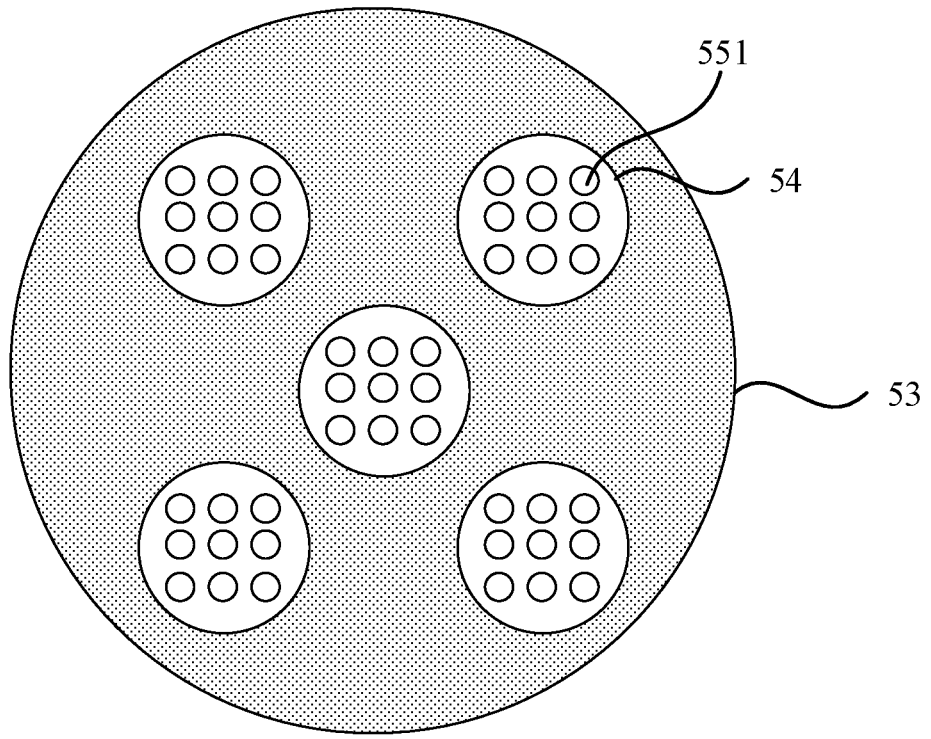
FIG. 5 is a top view illustrating the structure of another quantum dot film according to an embodiment of the present disclosure.

FIG. 5 is a top view illustrating the structure of another quantum dot film according to an embodiment of the present disclosure. Referring to FIG. 5, the edges of the quantum dot sets 54 include arcs. In the embodiment of the present disclosure, the edges of the quantum dot sets 54 are curves.

It is to be understood that in the case where an edge of a quantum dot set 54 is a straight line, light energy is distributed on both sides of the straight line, forming a plurality of bright and dark stripes parallel to the extension direction of the straight line. In the case where the edge of the quantum dot set 54 is an arc equivalent of a plurality of straight lines extending in different directions, light energy is distributed in a plurality of different directions, thus mitigating the diffraction phenomenon. In the embodiment of the present disclosure, the outer edges of the quantum dot sets 54 include arcs, thus mitigating the diffraction phenomenon of the second display region 102.

In an embodiment, referring to FIG. 5, the edges of the quantum dot sets 54 are circular or elliptical. In other embodiments, the edges of the quantum dot sets 54 may be other curves, which is not limited in the present disclosure.

In an embodiment, referring to FIG. 5, the edge of the quantum dot film 53 is circular or elliptical. In other embodiments, the edge of the quantum dot film 53 may be polygonal, for example, triangular, rectangular, pentagonal, and hexagonal.

Figure 6:
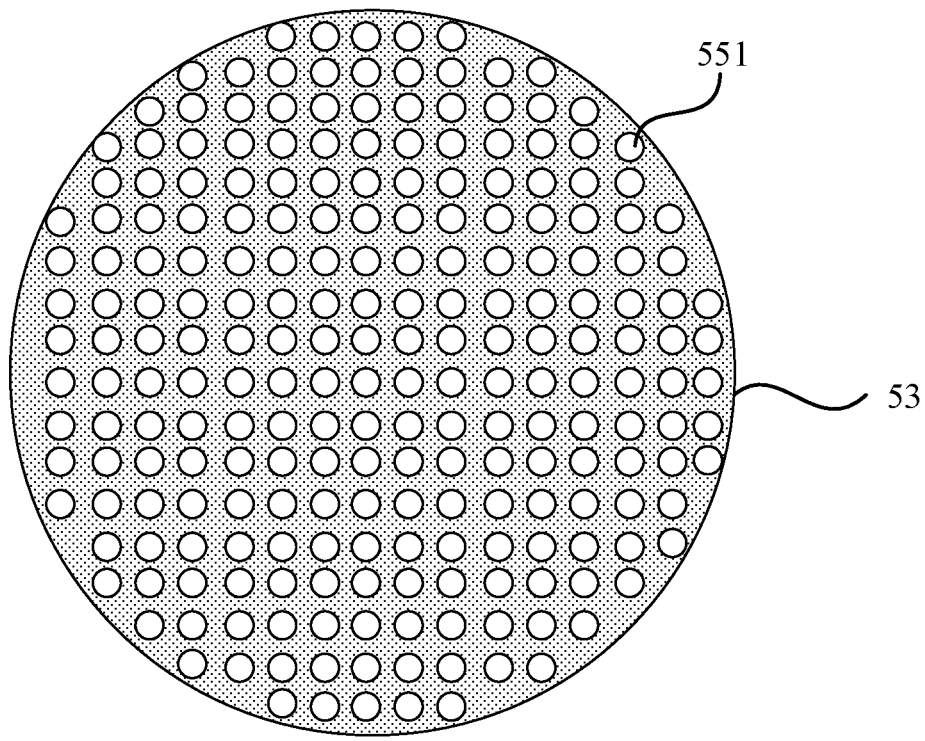
FIG. 6 is a top view illustrating the structure of another quantum dot film according to an embodiment of the present disclosure.

FIG. 6 is a top view illustrating the structure of another quantum dot film according to an embodiment of the present disclosure. Referring to FIG. 6, the quantum dot film 53 includes one quantum dot set 54. The infrared quantum dots 551 are distributed uniformly in the quantum dot film 53. In the embodiment of the present disclosure, the quantum dot film 53 includes one quantum dot set 54. The area of the quantum dot set 54 is equal to the area of the quantum dot film 53. The quantum dot film 53 is full of the infrared quantum dots 551. The infrared quantum dots 551 are distributed uniformly in the quantum dot film 53. It is to be understood that in manufacturing the quantum dot film 53, the infrared quantum dots 551 are dispersed uniformly in the quantum dot film 53. No special treatment is required for a partial region of the quantum dot film 53. This reduces the difficulty of manufacturing the quantum dot film 53. The first light L1 irradiates the quantum dot set 54 and excites the infrared light distributed uniformly in the second display region 102. This improves the uniformity of the infrared light irradiating the touched body Z in the process of fingerprint identification and enhances the accuracy of fingerprint identification. Moreover, the infrared quantum dots 551 are distributed uniformly in the quantum dot film 53. Accordingly, after passing through the regions outside the infrared quantum dots 551 in the quantum dot film 53, the second light L2 forms a relatively uniform backlight. This enhances the display quality of the liquid-crystal display device.

Figure 7:
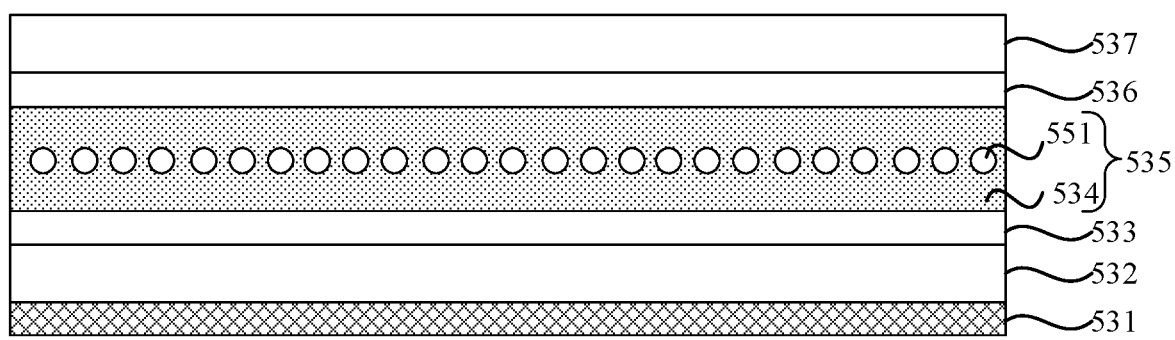
FIG. 7 is a section view illustrating the structure of a quantum dot film according to an embodiment of the present disclosure.

FIG. 7 is a section view illustrating the structure of a quantum dot film according to an embodiment of the present disclosure. The quantum dot film 53 includes a first substrate layer 532, a quantum dot layer 535, and a second substrate layer 537. The quantum dot layer 535 is disposed between the first substrate layer 532 and the second substrate layer 537. The quantum dot layer 535 includes an optical adhesive layer 534 and the infrared quantum dots 551. In the process of manufacturing the quantum dot film 53, the infrared quantum dots 551 may be dispersed in the optical adhesive layer 534 to form the quantum dot layer 535. Then the quantum dot layer 535 is encapsulated between the first substrate layer 532 and the second substrate layer 537. Then ultraviolet light is used for irradiating the quantum dot layer 535 and the optical adhesive layer 534 in the quantum dot layer 535 is cured. This helps maintain the highly efficient and stable light-emitting performance of the infrared quantum dots 551.

In an embodiment, referring to FIG. 7, the quantum dot film 53 further includes a first blocking layer 533, a second blocking layer 536, and a diffusion layer 531. The first blocking layer 533 is disposed between the first substrate layer 532 and the quantum dot layer 535. The second blocking layer 536 is disposed between the second substrate layer 537 and the quantum dot layer 535. The diffusion layer 531 is disposed on a side of the first substrate layer 532 facing away from the quantum dot layer 535. The diffusion layer 531 may be disposed between the light plate 52 and the first substrate layer 532. The light irradiating the quantum dot film 53 firstly irradiates the diffusion layer 531 in the quantum dot film 53. After homogenized by the diffusion layer 531, the light then irradiates the quantum dot layer 535 in the quantum dot film 53. This improves the uniformity of the first light L1 and the second light L2, thus improves the uniformity of infrared light, and improves the uniformity of backlight in the second display region 102.

In an embodiment, the infrared quantum dots 551 includes silver sulfide and/or lead sulfide. In comparison, the silver-based quantum dots (including silver sulfide and lead sulfide) are ideal quantum dot materials with low toxicity and even no toxicity. The excitation wavelength of silver sulfide and the excitation wavelength of lead sulfide are between 390 nm and 900 nm. Since the excitation wavelengths are in a relatively wide range, blue light or visible light may be used for excitation. The emission peak of silver sulfide is between 850 nm and 1250 nm. The emission peak of lead sulfide is between 780 nm and 1600 nm. Since the emission peak of silver sulfide and the emission peak of lead sulfide are in relatively wide ranges, an appropriate emission wavelength of infrared light may be determined by controlling the particle size of silver sulfide and the particle size of lead sulfide according to actual needs.

With continued reference to FIGS. 2 and 3, the fingerprint identification module 50 further includes an optical lens 58 disposed between the fingerprint identification sensor 51 and the light plate 52. The optical lens 58 is configured to converge the infrared light reflected by the touched body Z and then project the converged infrared light to the fingerprint identification sensor 51. In the embodiment of the present disclosure, the arrangement in which an optical lens is disposed between the fingerprint identification sensor 51 and the light plate 52 converges the infrared light to the fingerprint identification sensor 51 increases the intensity of the infrared light projected to the fingerprint identification sensor 51 and enhances the accuracy of fingerprint identification.

Figure 8:
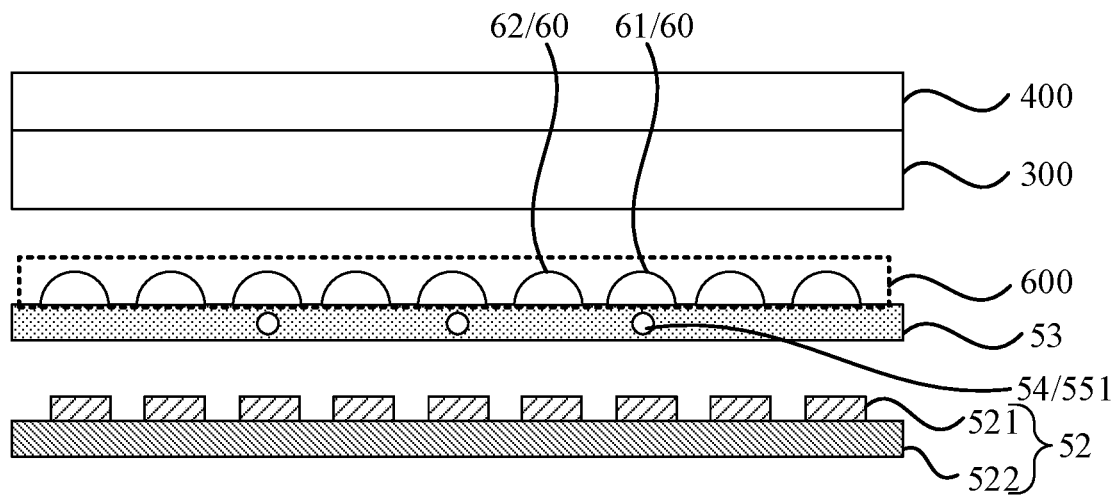
FIG. 8 is a section view illustrating the structure of another liquid-crystal display device according to an embodiment of the present disclosure.

FIG. 8 is a section view illustrating the structure of another liquid-crystal display device according to an embodiment of the present disclosure. Referring to FIG. 8, the liquid-crystal display device further includes a lens array 600 disposed between the quantum dot film 53 and the display panel 300. The lens array 600 includes a plurality of collimating lenses 60. In the direction perpendicular to the plane in which the quantum dot film 53 is located, the at least one quantum dot set 54 overlaps at least part of the collimating lenses 60. In the embodiment of the present disclosure, the collimating lenses 60 are disposed on a side of the at least one quantum dot set 54 facing the display panel 300. The first light L1 among the light emitted from the light plate 52 irradiates the at least one quantum dot set 54 and then excites infrared light. The collimating lenses 60 collimate the infrared light emitted from the at least one quantum dot set 54 into the parallel light which is then emitted to the display panel 300. Accordingly, the accuracy of fingerprint identification is enhanced.

Figure 9:
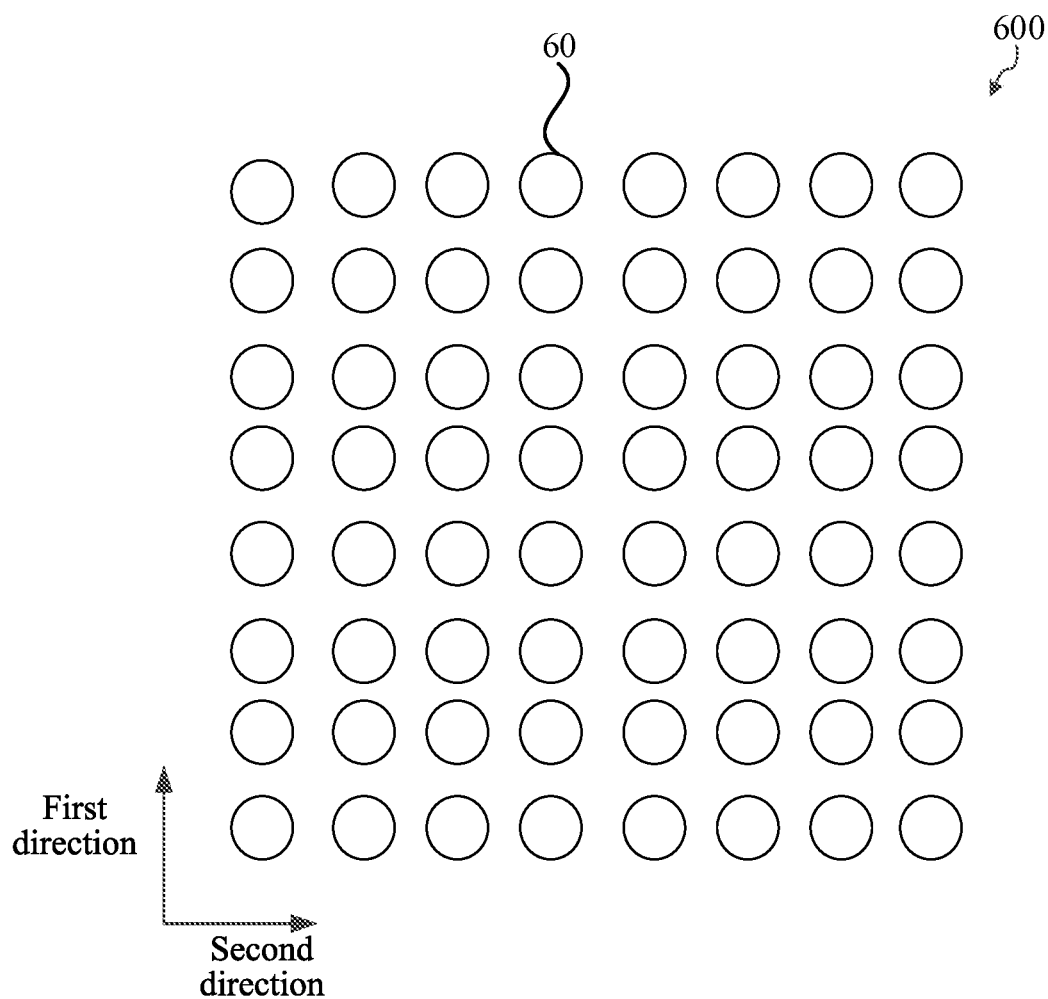
FIG. 9 is a top view illustrating the structure of a lens array according to an embodiment of the present disclosure.

FIG. 9 is a top view illustrating the structure of a lens array according to an embodiment of the present disclosure. Referring to FIG. 9, the collimating lenses 60 are hemispheric. The collimating lenses 60 are disposed in an array along a first direction and a second direction. The first direction intersects the second direction. In the embodiment of the present disclosure, the collimating lenses 60 are hemispheric so that the collimating lenses 60 perform the collimation effect on the light on any side. Further, on any side, the collimating lenses 60 have the same effect on the light. This improves the luminance uniformity of the light collimated by the collimator lenses 60.

Figure 10:
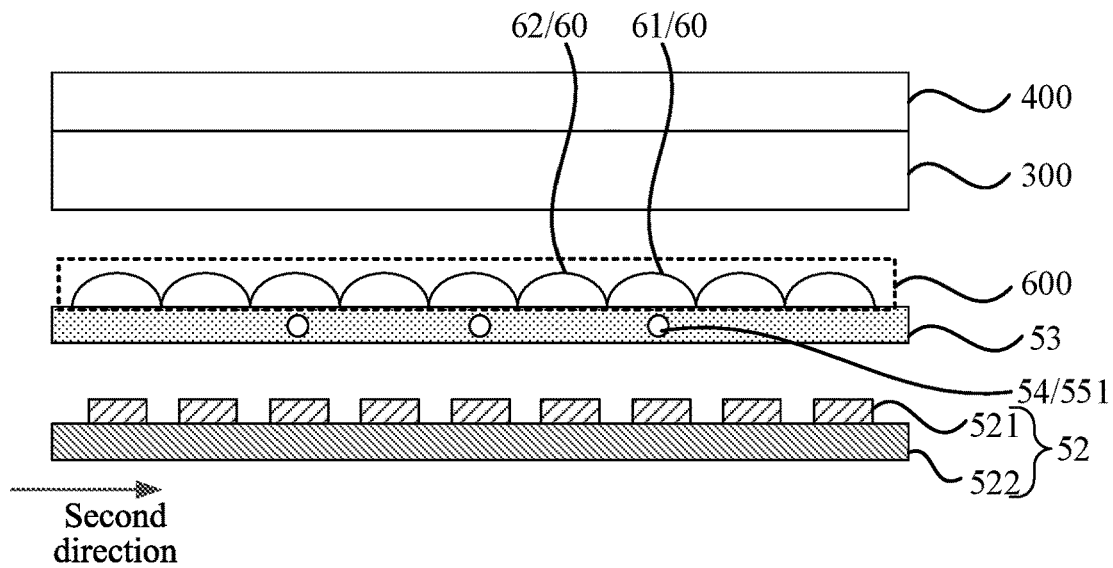
FIG. 10 is a section view illustrating the structure of another liquid-crystal display device according to an embodiment of the present disclosure.

FIG. 10 is a section view illustrating the structure of another liquid-crystal display device according to an embodiment of the present disclosure. Referring to FIG. 10, in the second direction, two adjacent collimating lenses 60 are in contact with each other. In the embodiment of the present disclosure, in the second direction, two adjacent collimating lenses 60 are in contact with each other. In this case, in the second direction, no gap exists between two adjacent collimating lenses 60. The collimating lenses 60 may not only collimate the infrared light generated through the first light L1 exciting the infrared quantum dots 551 but also collimate the second light L2 into the parallel light when then serves as the backlight of the display panel 300. Accordingly, the luminance uniformity of the display and the display effect are improved. In another embodiment, along the first direction, two adjacent collimating lenses 60 are in contact with each other. In this case, in the first direction, no gap exists between two adjacent collimating lenses 60. In another embodiment, in the first direction, two adjacent collimating lenses 60 are in contact with each other; moreover, in the second direction, two adjacent collimating lenses 60 are in contact with each other. In this case, in the first direction and the second direction, no gap exists between two adjacent collimating lenses 60.

Figure 11:
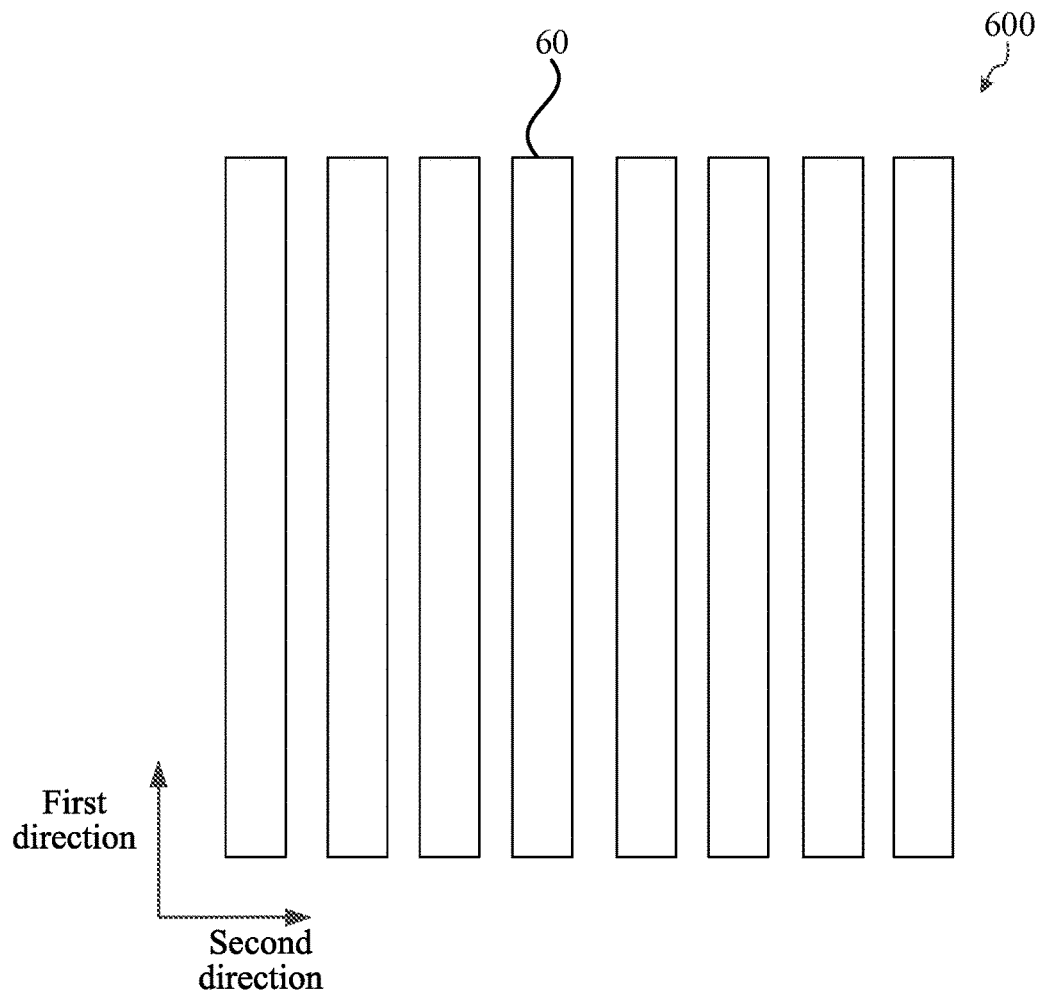
FIG. 11 is a top view illustrating the structure of another lens array according to an embodiment of the present disclosure.

FIG. 11 is a top view illustrating the structure of another lens array according to an embodiment of the present disclosure. Referring to FIG. 11, the collimating lenses 60 are semi-cylindrical. The collimating lenses 60 extend in the first direction and are disposed in the second direction. The first direction intersects the second direction. In the embodiment of the present disclosure, one collimating lens 60 may overlap one or multiple quantum dot sets 54 disposed in the first direction. The collimating lens 60 may collimate the light in the plane perpendicular to the first direction.

In an embodiment, referring to FIGS. 8 and 10, the collimating lenses 60 include a first collimating lens 61 and a second collimating lens 62. In the direction perpendicular to the plane in which the quantum dot film 53 is located, the at least one quantum dot set 54 overlaps the first collimating lens 61. The first light L1 among the light emitted from the light plate 52 irradiates the at least one quantum dot set 54 and then excites infrared light. The first collimating lens 61 collimate the infrared light emitted from the at least one quantum dot set 54 into the parallel light which is then emitted to the display panel 300. Accordingly, the accuracy of fingerprint identification is enhanced. The gap between two adjacent quantum dot sets 54 overlaps the second collimating lens 62. The at least one quantum dot set 54 does not overlap the second collimating lens 62. The second light L2 among the light emitted from the light plate 52 passes through the gap between two adjacent quantum dot sets 54, is collimated by the second collimating lens 62, and is emitted to the display panel 300. Accordingly, the luminance uniformity of the display and the display effect are improved.

In an embodiment, with continued reference to FIG. 3, the light plate 52 includes a plurality of light-emitting diodes 521. The light-emitting diodes 521 may be organic light-emitting diodes or inorganic light-emitting diodes. When recombined in the light-emitting diodes 521, electrons and holes radiate to produce light.

In an embodiment, with continued reference to FIG. 3, in the direction perpendicular to the plane in which the quantum dot film 53 is located, the at least one quantum dot set 54 overlaps the light-emitting diodes 521. In the embodiment of the present disclosure, the at least one quantum dot set 54 is disposed on a side of the light-emitting diodes 521 facing the display panel 300 and is disposed in the perpendicular light-emitting direction of the light-emitting diodes 521. The light intensity of the light-emitting diodes 521 in the perpendicular light-emitting direction of the light-emitting diodes 521 is relatively large. This increases the intensity of the infrared light generated through the first light L1 irradiates the infrared quantum dots 551 and thus enhances the accuracy of fingerprint identification.

Figure 12:
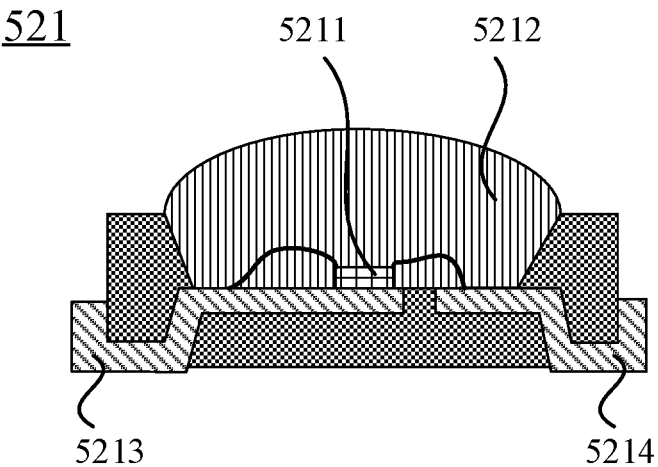
FIG. 12 is a section view illustrating the structure of a light-emitting diode according to an embodiment of the present disclosure.

FIG. 12 is a section view illustrating the structure of a light-emitting diode according to an embodiment of the present disclosure. Referring to FIG. 12, the light-emitting diode 521 includes a light-emitting chip 5211 and a phosphor layer 5212. The blue light emitted from the light-emitting chip 5211 generates white light after irradiating the phosphor layer 5212. In the embodiment of the present disclosure, the light-emitting diode 521 emits light through irradiating the phosphor layer 5212 with the light-emitting chip 5211. With an aim of decreasing the number of elements used and reducing the light energy loss of the light-emitting chip 5211, the phosphor layer 5212 is in direct contact with the light-emitting chip 5211. No other elements (for example, glass) are disposed between the phosphor layer 5212 and the light-emitting chip 5211, thus resulting in no light energy loss on other elements. The light emitted from the light-emitting chip 5211 may irradiate the phosphor layer 5212 directly and excite the phosphor layer 5212 to emit fluorescent light. Accordingly, the light-emitting efficiency of the light-emitting diode 521 is enhanced. In the embodiment of the present disclosure, the light-emitting chip 5211 emits white light (that is, natural light). The first light L1 irradiates the infrared quantum dots 551, excites the infrared quantum dots 551 to generate infrared light through the mode of white light exciting infrared light, and serves as the light source for fingerprint identification. Serving as white light, the second light L2 provides backlight for the second display region 102 of the display panel 300 directly.

In an embodiment, referring to FIG. 12, the light-emitting diode 521 may further include a first electrode 5213 and a second electrode 5214. The light-emitting chip 5211 is secured to the first electrode 5213. For example, the light-emitting chip 5211 may be secured to the first electrode 5213 through die bond adhesive and the light-emitting chip 5211 is in good contact with the first electrode 5213. Moreover, the die bond adhesive is cured through baking and the light-emitting chip 5211 is firmly secured to the first electrode 5213. The first electrode 5213 and the second electrode 5214 are both electrically connected to the light-emitting chip 5211 through leads and provide operating voltage for the light-emitting chip 5211. In some embodiments, part of the light-emitting chip 5211 is secured to the first electrode 5213 and another part of the light-emitting chip 5211 is secured to the second electrode 5214. This arrangement easily destroys the light-emitting chip 5211 due to thermal expansion and contraction. In the embodiment of the present disclosure, the arrangement in which the light-emitting chip 5211 is secured to the first electrode 5213 solves the problem of destroying the light-emitting chip 5211 due to thermal expansion and contraction. Of course, the first electrode may be an anode or a cathode, which is not limited in the present disclosure.

Figure 13:
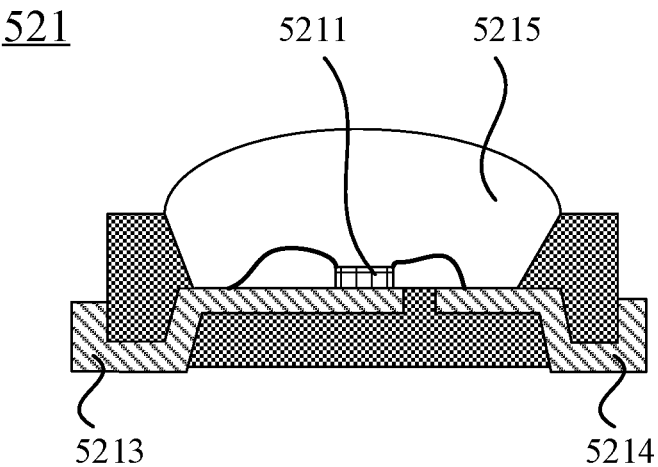
FIG. 13 is a section view illustrating the structure of another light-emitting diode according to an embodiment of the present disclosure.
Figure 14:
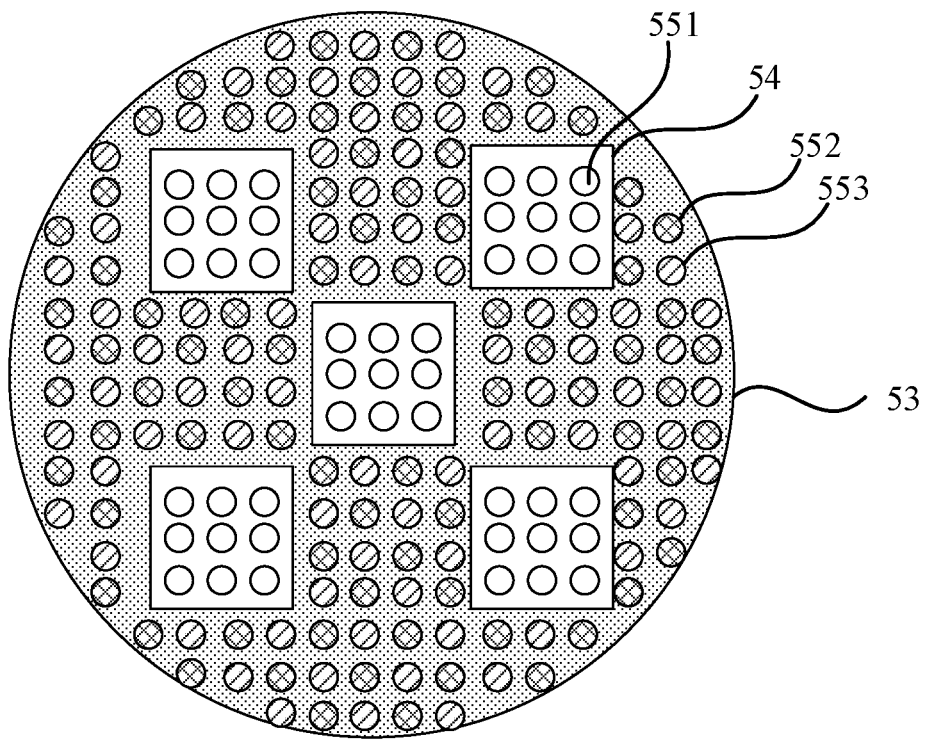
FIG. 14 is a top view illustrating the structure of another quantum dot film according to an embodiment of the present disclosure.

FIG. 13 is a section view illustrating the structure of another light-emitting diode according to an embodiment of the present disclosure. FIG. 14 is a top view illustrating the structure of another quantum dot film according to an embodiment of the present disclosure. Referring to FIGS. 13 and 14, the light-emitting diode 521 includes a light-emitting chip 5211 configured to emit blue light. The quantum dot film 53 includes a plurality of quantum dot sets 54 distributed discretely. The quantum dot film 53 further includes red quantum dots 552 and green quantum dots 553. In the plane in which the quantum dot film 53 is located, the red quantum dots 552 and the green quantum dots 553 are both disposed in gaps between two adjacent quantum dot sets 54. The red quantum dots 552 are disposed in the regions outside the quantum dot sets 54 in the quantum dot film 53. The green quantum dots 553 are disposed in the regions outside the quantum dot sets 54 in the quantum dot film 53. The blue light emitted from the light-emitting chip 5211 generates red light after irradiating the red quantum dots 552. The blue light emitted from the light-emitting chip 5211 generates green light after irradiating the green quantum dots 553. In the embodiment of the present disclosure, the light-emitting chip 5211 emits blue light. The first light L1 irradiates the infrared quantum dots 551, excites the infrared quantum dots 551 to generate infrared light through the mode of blue light exciting infrared light, and serves as the light source for fingerprint identification. Serving as blue light, the second light L2 irradiates the red quantum dots 552 and generates red light; the second light L2 irradiates the green quantum dots 553 and generates green light. Red light, green light, and blue light are mixed into white light to provide backlight for the second display region 102 of the display panel 300. Further, in the embodiment of the present disclosure, the infrared quantum dots 551, the red quantum dots 552, and the green quantum dots 553 are all disposed in the quantum dot film 53. Accordingly, the thickness of the liquid-crystal display device is decreased.

In an embodiment, referring to FIG. 13, the light-emitting diode 521 further includes an encapsulation adhesive layer 5215. The encapsulation adhesive layer 5215 disposed on the light-emitting side of the light-emitting chip 5211 and is configured to encapsulate the light-emitting chip 5211. The encapsulation adhesive layer 5215 includes a transparent material but excludes phosphor. Accordingly, the blue light emitted by the light-emitting chip 5211 is emitted directly through the encapsulation adhesive layer 5215 out of the light-emitting chip 5211.

Figure 15:
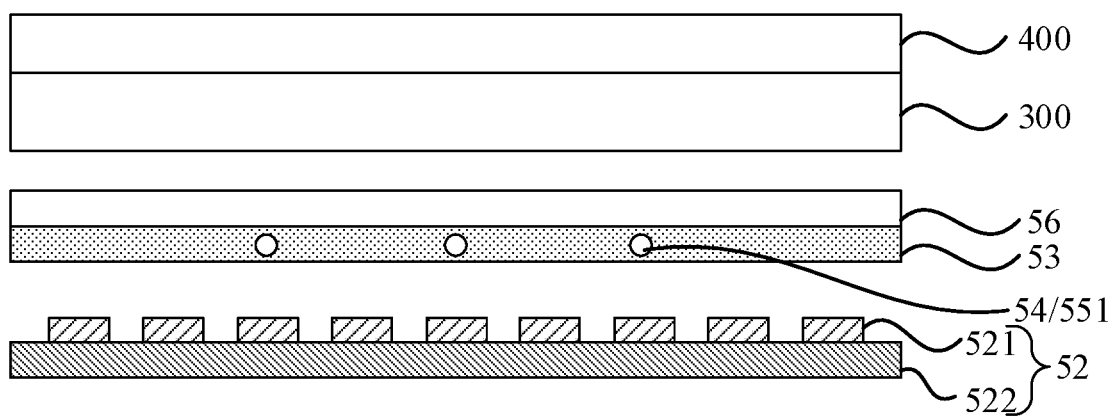
FIG. 15 is a section view illustrating the structure of another liquid-crystal display device according to an embodiment of the present disclosure.
Figure 16:
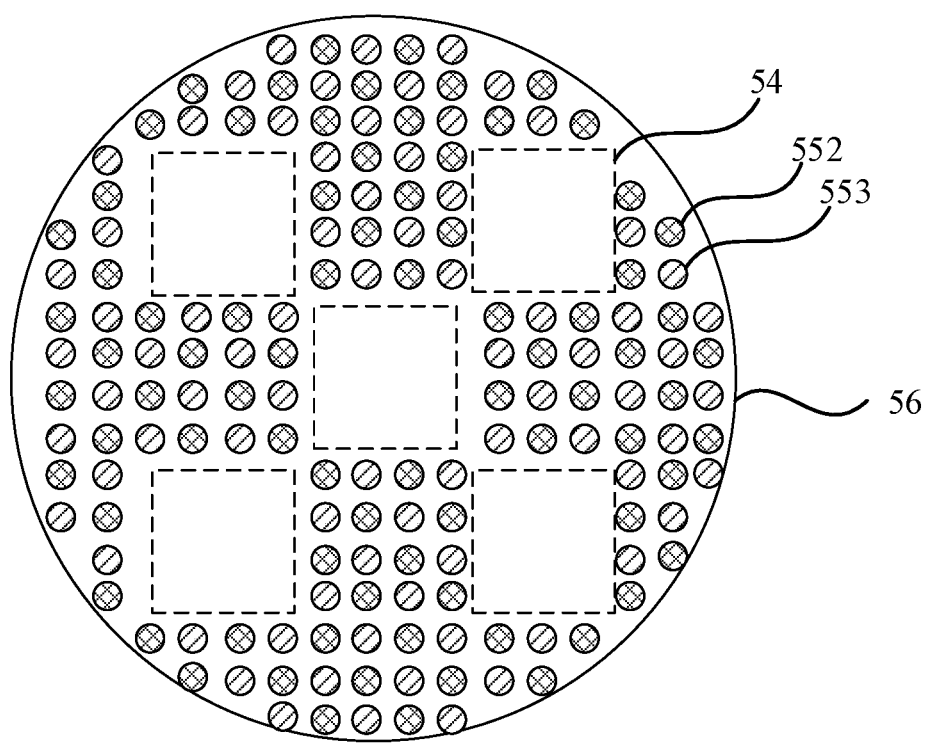
FIG. 16 is a top view illustrating the structure of an auxiliary quantum dot film according to an embodiment of the present disclosure.

FIG. 15 is a section view illustrating the structure of another liquid-crystal display device according to an embodiment of the present disclosure. FIG. 16 is a top view illustrating the structure of an auxiliary quantum dot film according to an embodiment of the present disclosure. Referring to FIGS. 13, 15, and 16, the liquid-crystal display device further includes an auxiliary quantum dot film 56 disposed between the light plate 52 and the display panel 300. The auxiliary quantum dot film 56 includes the red quantum dots 552 and the green quantum dots 553. A light-emitting diode 521 includes a light-emitting chip 5211 for emitting blue light. The quantum dot film 53 includes a plurality of quantum dot sets 54 distributed discretely. The projection of a red quantum dot 552 on the plane in which the quantum dot film 53 is located and the projection of a green quantum dot 553 on the plane in which the quantum dot film 53 is located are both disposed in the gap between two adjacent quantum dot sets 54. That is, the projection of a red quantum dot 552 on the plane in which the quantum dot film 53 is located does not overlap a quantum dot set 54. The projection of a green quantum dot 553 on the plane in which the quantum dot film 53 is located does not overlap a quantum dot set 54. The blue light emitted from the light-emitting chip 5211 generates red light after irradiating the red quantum dots 552. The blue light emitted from the light-emitting chip 5211 generates green light after irradiating the green quantum dots 553. In the embodiment of the present disclosure, the infrared quantum dots 551 are disposed in the quantum dot film 53. The red quantum dots 552 and the green quantum dots 553 are disposed in the auxiliary quantum dot film 56. Since the red quantum dots 552 and the green quantum dots 553 are disposed another layer outside the quantum dot film 53, types of quantum dots in a single layer are reduced. Accordingly, the difficulty in disposing the infrared quantum dots 551 in the quantum dot film 53 is reduced; moreover, the difficulty in disposing the red quantum dots 552 and the green quantum dots 553 in the auxiliary quantum dot film 56 is reduced.

In an embodiment, referring to FIG. 15, the auxiliary quantum dot film 56 is disposed between the quantum dot film 53 and the display panel 300. In other embodiments, the auxiliary quantum dot film 56 may be further disposed between the quantum dot film 53 and the light plate 52.

In an embodiment, with continued reference to FIG. 3, the light plate 52 further includes a light plate circuit board 522. The light-emitting diodes 521 are disposed on the light plate circuit board 522. The light plate circuit board 522 includes a circuit board substrate layer (not shown in FIG. 3) and a wiring layer (not shown in FIG. 5). The circuit board substrate layer includes a transparent material. In the embodiment of the present disclosure, the light-emitting diodes 521 may be electrically connected to the light plate circuit board 522 and then electrically connected to a main board through the wiring layer on the light plate circuit board 522. Accordingly, the light-emitting diodes 521 are driven to emit light through the main board. The circuit board substrate layer includes a transparent material and serves as a light-transmitting layer. The infrared light reflected by the touched body Z may pass through the gaps between the light-emitting diodes 521 and through the light plate circuit board 522 to reach the fingerprint identification sensor 51 so that fingerprint identification is performed.

Figure 17:
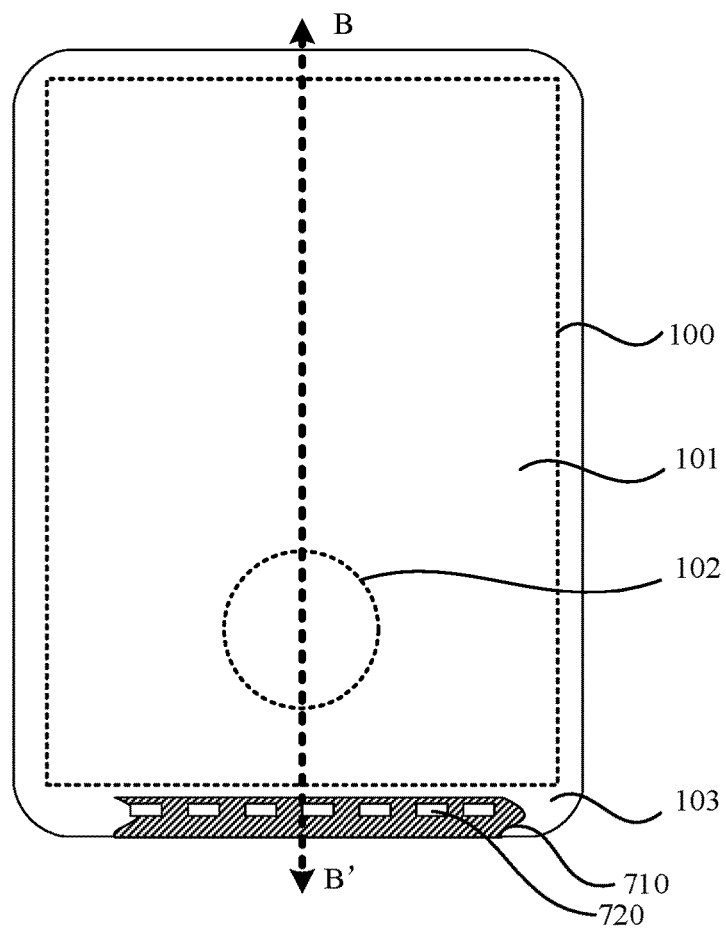
FIG. 17 is a top view illustrating the structure of another liquid-crystal display device according to an embodiment of the present disclosure.
Figure 18:
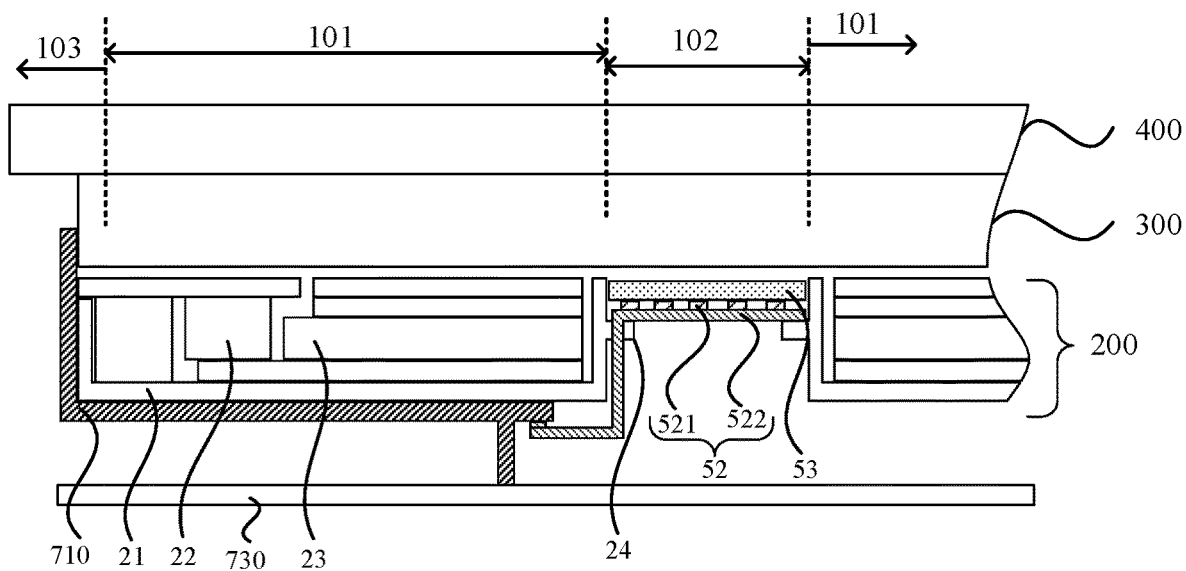
FIG. 18 is a section view taken along direction BB' of FIG. 17.
Figure 19:
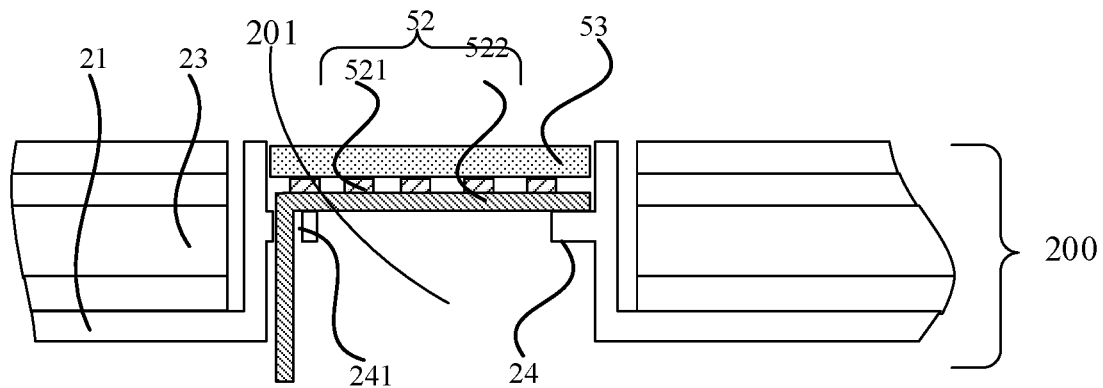
FIG. 19 is an enlarged view illustrating the structure of a second display region of FIG. 18.

FIG. 17 is a top view illustrating the structure of another liquid-crystal display device according to an embodiment of the present disclosure. FIG. 18 is a section view taken along direction BB' of FIG. 17. FIG. 19 is an enlarged view illustrating the structure of a second display region of FIG. 18. Referring to FIGS. 17 to 19, the display panel 300 further includes a non-display region 103 disposed at the periphery of the display region 100. The liquid-crystal display device further includes a flexible circuit board 710 and a main board 730. One end of the flexible circuit board 710 is electrically connected to a binding terminal 720 in the non-display region 103 of the display panel 300. Another end of the flexible circuit board 710 is electrically connected to the main board 730. The flexible circuit board 710 may be bent from a side of the display panel 300 facing away from the main board 730 to a side of the display panel 300 facing the main board 730. That is, the flexible circuit board 710 may be bent from the front of the display panel 300 to the back of the display panel 300. The light plate circuit board 522 is electrically connected to the flexible circuit board 710. In the embodiment of the present disclosure, the light plate circuit board 522 is electrically connected to the flexible circuit board 710 and the flexible circuit board 710 is electrically connected to the main board 730. Accordingly, the light plate circuit board 522 is electrically connected to the main board 730 through the flexible circuit board 710, and the light-emitting diodes 521 are driven to emit light through the main board 730.

Figure 20:
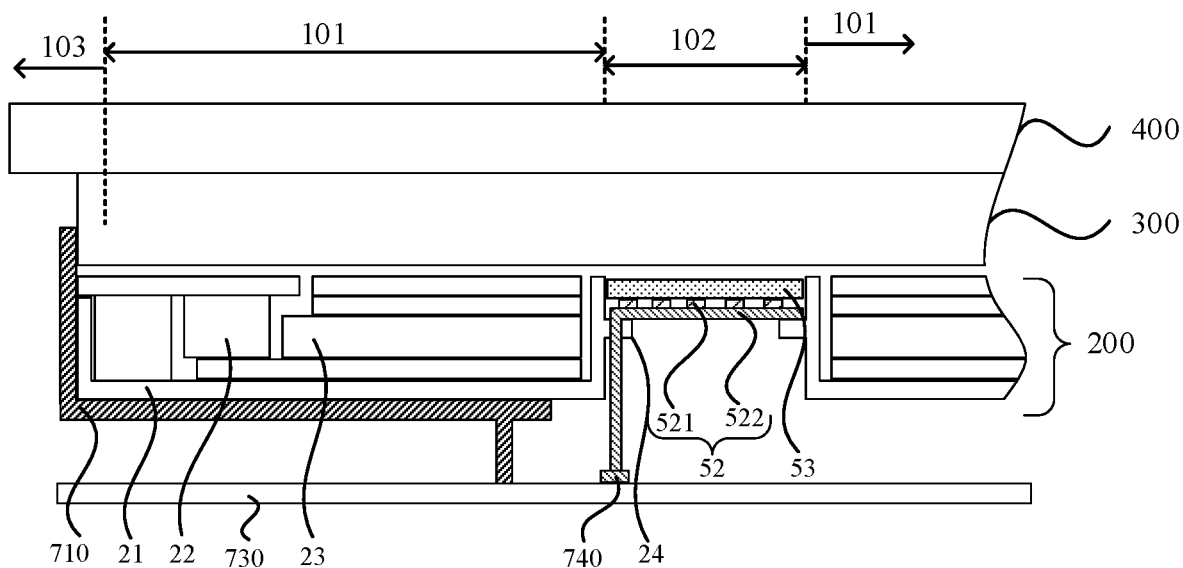
FIG. 20 is a section view illustrating the structure of another liquid-crystal display device according to an embodiment of the present disclosure.

FIG. 20 is a section view illustrating the structure of another liquid-crystal display device according to an embodiment of the present disclosure. Referring to FIG. 20, the liquid-crystal display device further includes a connector 740 and the main board 730. One end of the connector 740 is electrically connected to the light plate circuit board 522. Another end of the connector 740 is electrically connected to the main board 730. In this embodiment of the present disclosure, the liquid-crystal display device further includes a connector 740. Accordingly, the light plate circuit board 522 is electrically connected to the main board 730 through the connector 740 and the light-emitting diodes 521 are driven to emit light through the main board 730.

In an embodiment, referring to FIGS. 18 and 19, the backlight module 200 includes a backplane main board 21, a light source 22, and a plurality of optical film layers 23. The light source 22 and the optical film layers 23 are disposed between the backplane main board 21 and the display panel 300. The backlight module 200 further includes a backplane secondary plate 24 disposed inside the via 201 and formed integrally with the backplane main board 21. The backplane secondary plate 24 and the backplane main board 21 are formed using the same material in the same process. The backplane secondary plate 24 is connected to the backplane main board 21. In the direction perpendicular to the plane in which the quantum dot film 53 is located, the backplane secondary plate 24 is disposed between the quantum dot film 53 and the fingerprint identification sensor 51. The backplane secondary plate 24 is configured to bear the quantum dot film 53 and the light plate 52. In the embodiment of the present application, the arrangement in which the backplane secondary plate 24 is disposed inside the via 201 and configured to bear the quantum dot film 53 and the light plate 52 enables the backplane secondary plate 24 to be formed integrally with the backplane main board 21, thus simplifying the manufacturing process of the backplane secondary plate 24. The backplane secondary plate 24 blocks part of the via 201. The infrared light reflected by the touched body Z is projected to the fingerprint identification sensor 51 through the region not provided with the backplane secondary plate 24 in the via 201. It is to be noted that the backlight module 200 may be a direct-lit backlight module or an edge-lit backlight module. The optical film layers 23 may include structures known in the art, for example, a light guide plate and a diffusion film, which is not repeated herein.

In an embodiment, referring to FIGS. 18 and 19, the backplane secondary plate 24 is provided with a lead aperture 241 penetrating through the backplane secondary plate 24. The light plate 52 further includes a plurality of light-emitting diodes 521 and the light plate circuit board 522. The light-emitting diodes 521 are disposed on the light plate circuit board 522. The light plate circuit board 522 passes through the lead aperture 241. In the embodiment of the present disclosure, one end of the light plate circuit board 522 is disposed on a side of the backplane secondary plate 24 facing the display panel 300 and is electrically connected to the light-emitting diodes 521. Another end of the light plate circuit board 522 is disposed on a side of the backplane secondary plate 24 facing away from the display panel 300, passes through the lead aperture 241, and is electrically connected to the main board 730.

Figure 21:
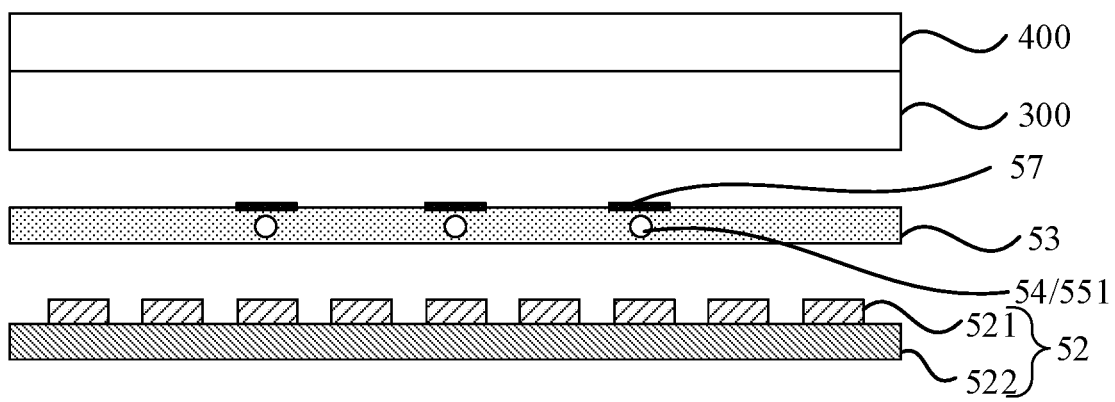
FIG. 21 is a section view illustrating the structure of another liquid-crystal display device according to an embodiment of the present disclosure.

FIG. 21 is a section view illustrating the structure of another liquid-crystal display device according to an embodiment of the present disclosure. Referring to FIG. 21, the liquid-crystal display device further includes a patterned ink layer 57 disposed on a side of the quantum dot film 53 facing away from the light plate 52. In the direction perpendicular to the plane in which the quantum dot film 53 is located, the patterned ink layer 57 overlaps the at least one quantum dot set 54. The patterned ink layer 57 is configured to transmit infrared light and absorb light outside a band of the infrared light. In the embodiment of the present disclosure, the liquid-crystal display device further includes a patterned ink layer 57 disposed on a side of the at least one quantum dot set 54 facing the display panel. The infrared light excited by the infrared quantum dots 551 in the at least one quantum dot set 54 may pass through the ink layer 57 and irradiate the touched body Z (not shown in FIG. 21). The ink layer 57 does not affect the transmission of infrared light or affect fingerprint identification. Moreover, the arrangement in which the ink layer 57 is disposed on a side of the at least one quantum dot set 54 facing the display panel 300 blocks the ambient light from a side of the display panel 300 to irradiate the infrared quantum dots 551 in the at least one quantum dot set 54, prevents the infrared light generated through the ambient light exciting the infrared quantum dots 551 from being projected to the fingerprint identification sensor 51, and thus mitigates the interference of the ambient light on the process of fingerprint identification. Further, the patterned ink layer 57 retains the gaps through which the second light L2 passes. That is, compared with the arrangement in which the ink layer 57 is arranged as an entire layer, the ink layer 57 is patterned and only disposed above the at least one quantum dot set 54. The regions outside the at least one quantum dot set 54 are not provided with the ink layer 57. This prevents the ink layer 57 from absorbing the second light L2 and improves the backlight luminance of the second display region 102.

In an embodiment, referring to FIG. 21, the patterned ink layer 57 is disposed between the quantum dot film 53 and the display panel 300 and is integrated on the quantum dot film 53. In the embodiment of the present disclosure, the arrangement in which the patterned ink layer 57 is integrated on the quantum dot film 53 results in the shortest distance between the ink layer 57 and the quantum dot film 53, leads to a best blocking effect of the ink layer 57 on the infrared quantum dots 551 in the at least one quantum dot set 54, and thus further mitigates the interference of the ambient light on the process of fingerprint identification.

What is claimed is:

1. A liquid-crystal display device, comprising:
    a display panel comprising a display region, wherein the display region comprises a first display region and a second display region, and the second display region further serves as a light sensing element region;
    a backlight module configured to provide backlight for the display panel and provided with a via penetrating through the backlight module, wherein in a direction perpendicular to a light-emitting surface of the display panel, the via overlaps the light sensing element region; and
    a fingerprint identification module disposed inside the via and comprising a fingerprint identification sensor, a light plate, and a quantum dot film, wherein the light plate is disposed between the fingerprint identification sensor and the quantum dot film, and the quantum dot film is disposed between the light plate and the display panel;
    wherein the quantum dot film comprises at least one quantum dot set; the at least one quantum dot set comprises infrared quantum dots; during a fingerprint identification, light emitted from the light plate comprises first light and second light; the first light is configured to irradiate the infrared quantum dots and generate infrared light; the fingerprint identification sensor is configured to perform fingerprint identification according to infrared light reflected by a touched body; and the second light is configured to not irradiate the infrared quantum dots and is used for providing backlight for the display panel.

2. The liquid-crystal display device according to claim 1, wherein the quantum dot film comprises a plurality of quantum dot sets distributed discretely.

3. The liquid-crystal display device according to claim 1, wherein the quantum dot film comprises one quantum dot set, wherein the infrared quantum dots are distributed uniformly in the quantum dot film.

4. The liquid-crystal display device according to claim 1, wherein the quantum dot film comprises a first substrate layer, a quantum dot layer, and a second substrate layer; the quantum dot layer is disposed between the first substrate layer and the second substrate layer; and the quantum dot layer comprises an optical adhesive layer and the infrared quantum dots.

5. The liquid-crystal display device according to claim 1, wherein the infrared quantum dots comprise at least one of silver sulfide or lead sulfide.

6. The liquid-crystal display device according to claim 1, wherein the fingerprint identification module further comprises an optical lens disposed between the fingerprint identification sensor and the light plate, and the optical lens is configured to converge the infrared light reflected by the touched body and project the converged infrared light to the fingerprint identification sensor.

7. The liquid-crystal display device according to claim 1, further comprising a lens array disposed between the quantum dot film and the display panel, wherein the lens array comprises a plurality of collimating lenses, wherein
    in a direction perpendicular to a plane in which the quantum dot film is located, the at least one quantum dot set overlaps at least part of the plurality of collimating lenses.

8. The liquid-crystal display device according to claim 7, wherein the plurality of collimating lenses each is hemispherical, the plurality of collimating lenses is disposed in an array in a first direction and a second direction, and the first direction intersects the second direction.

9. The liquid-crystal display device according to claim 8, wherein two adjacent collimating lenses of the plurality of collimating lenses are in contact with each other in at least one of the first direction or the second direction.

10. The liquid-crystal display device according to claim 7, wherein the plurality of collimating lenses each is semi-cylindrical, the plurality of collimating lenses extends in a first direction and are disposed in a second direction, and the first direction intersects the second direction.

11. The liquid-crystal display device according to claim 7, wherein
    the plurality of collimating lenses comprises a first collimating lens and a second collimating lens; and
    in the direction perpendicular to the plane in which the quantum dot film is located, the at least one quantum dot set overlaps the first collimating lens; and a gap between two adjacent ones of the at least one quantum dot set overlaps the second collimating lens.

12. The liquid-crystal display device according to claim 1, wherein the light plate comprises a plurality of light-emitting diodes.

13. The liquid-crystal display device according to claim 12, wherein in a direction perpendicular to a plane in which the quantum dot film is located, the at least one quantum dot set overlaps the plurality of light-emitting diodes.

14. The liquid-crystal display device according to claim 12, further comprising an auxiliary quantum dot film disposed between the light plate and the display panel, wherein the auxiliary quantum dot film comprises red quantum dots and green quantum dots;
    wherein each of the plurality of light-emitting diodes comprises a light-emitting chip for emitting blue light;
    wherein the quantum dot film comprises a plurality of quantum dot sets distributed discretely; a projection of each of the red quantum dots on a plane in which the quantum dot film is located and a projection of each of the green quantum dots on the plane in which the quantum dot film is located are both disposed in a gap between two adjacent ones of the plurality of quantum dot sets; and
    wherein the blue light emitted from the light-emitting chip is configured to irradiate the red quantum dots to generate red light, and the blue light emitted from the light-emitting chip is configured to irradiate the green quantum dots to generate green light.

15. The liquid-crystal display device according to claim 12, wherein the light plate further comprises a light plate circuit board, wherein the plurality of light-emitting diodes is disposed on the light plate circuit board, wherein
    the light plate circuit board comprises a circuit board substrate layer and a wiring layer, and the circuit board substrate layer comprises a transparent material.

16. The liquid-crystal display device according to claim 15, wherein the display panel further comprises a non-display region disposed at a periphery of the display region, wherein the liquid-crystal display device further comprises a flexible circuit board and a main board, one end of the flexible circuit board is electrically connected to a bonding terminal in the non-display region of the display panel, another end of the flexible circuit board is electrically connected to the main board, and the light plate circuit board is electrically connected to the flexible circuit board.

17. The liquid-crystal display device according to claim 15, further comprising a connector and a main board, wherein one end of the connector is electrically connected to the light plate circuit board, and another end of the connector is electrically connected to the main board.

18. The liquid-crystal display device according to claim 1, further comprising a patterned ink layer disposed on a side of the quantum dot film facing away from the light plate, wherein in a direction perpendicular to a plane in which the quantum dot film is located, the patterned ink layer overlaps the at least one quantum dot set; and the patterned ink layer is configured to transmit infrared light and absorb light outside a band of the infrared light.

19. The liquid-crystal display device according to claim 1, wherein the backlight module comprises a backplane main board, a light source, and a plurality of optical film layers, wherein the light source and the plurality of optical film layers are disposed between the backplane main board and the display panel; and wherein the backlight module further comprises a backplane secondary plate disposed inside the via and formed integrally with the backplane main board, wherein in a direction perpendicular to a plane in which the quantum dot film is located, the backplane secondary plate is disposed between the quantum dot film and the fingerprint identification sensor; and the backplane secondary plate is configured to bear the quantum dot film and the light plate.

20. The liquid-crystal display device according to claim 19, wherein the backplane secondary plate is provided with a lead aperture penetrating through the backplane secondary plate, and wherein the light plate further comprises a plurality of light-emitting diodes and a light plate circuit board, the plurality of light-emitting diodes is disposed on the light plate circuit board, and the light plate circuit board passes through the lead aperture.

* * * * *